United States Patent [19]
Lanzerotti et al.

[11] Patent Number: 5,745,384
[45] Date of Patent: Apr. 28, 1998

[54] SYSTEM AND METHOD FOR DETECTING A SIGNAL IN A NOISY ENVIRONMENT

[75] Inventors: Louis J. Lanzerotti, Morristown; Carol G. Maclennan, Summit; Lester V. Medford; David James Thomson, both of Murray Hill, all of N.J.

[73] Assignee: Lucent Technologies, Inc., Murray Hill, N.J.

[21] Appl. No.: 508,274

[22] Filed: Jul. 27, 1995

[51] Int. Cl.$^6$ ........................................ H03F 1/26

[52] U.S. Cl. .................. 364/574; 364/823; 395/929; 395/930; 704/226

[58] Field of Search ........................ 364/574, 572, 364/551.01, 420, 569, 578; 395/928, 929, 930, 931; 340/552, 601, 825.73; 324/350, 357; 704/226; 381/71.12, 71.14

[56] References Cited

U.S. PATENT DOCUMENTS

| | | | |
|---|---|---|---|
| 3,987,445 | 10/1976 | Fales, III | 343/112 R |
| 4,336,593 | 6/1982 | Takase | 364/574 |
| 4,435,751 | 3/1984 | Hon et al. | 364/574 |
| 4,463,357 | 7/1984 | MacDoran | 343/460 |
| 4,757,262 | 7/1988 | Bostick, Jr. | 324/350 |
| 4,835,473 | 5/1989 | Bostick, Jr. | 324/350 |
| 4,942,546 | 7/1990 | Rambaut | 364/574 |
| 5,295,225 | 3/1994 | Kane et al. | 704/226 |
| 5,297,289 | 3/1994 | Mintzer . | |
| 5,299,165 | 3/1994 | Kimura et al. . | |
| 5,373,456 | 12/1994 | Ferkinhoff et al. | 364/574 |
| 5,426,703 | 6/1995 | Hamabe et al. | 381/71.12 |
| 5,442,696 | 8/1995 | Lindberg et al. | 340/825.73 |
| 5,521,851 | 5/1996 | Wei et al. | 364/517 |
| 5,523,763 | 6/1996 | Loomis | 342/357 |
| 5,530,347 | 6/1996 | Heflinger | 324/301 |

FOREIGN PATENT DOCUMENTS

WO91/04552  4/1991  WIPO .

OTHER PUBLICATIONS

T. Hara et al., "Analysis of Radiation Noise from Digital Circuit Board by Using Cepstrum," Denshi Tokyo, IEEE Tokyo, No. 33, 1994, pp. 163–166.

The Electrical Engineering Handbook (R.C. Dorf, Ed.), CRC Press, Inc., Boca Raton, Florida, 1993, pp. 302–305.

A. D. Chave et al., "On the Robust Estimation of Power Spectra, Coherences, and Transfer Functions", Journal of Geophysical Research, vol. 92, No. B1, 1987, pp. 638–648.

A. D. Chave et al., "Some Comments on Magnetotelluric Response Function Estimation", Journal of Geophysical Research, vol. 94, No. B10, 1989, pp. 14.215–14.225.

L. J. Lanzerotti et al., "Electromagnetic Study of the Atlantic Continental Margin Using a Section of a Transatlantic Cable", Journal of Geophysical Research, vol. 91, No. B7, 1986, pp. 7417–7427.

A. Meloni et al., "Induction of Currents in Long Submarine Cables by Natural Phenomena", Review of Geophysics and Space Physics, vol. 21, No. 4, 1983, pp. 794–803.

C. S. Powell, "EQ, Phone Home", Scientific American, Jan. 1994, p. 19.

D. J. Thomson et al., "Jackknifed Error Estimates for Spectra, Coherences, and Transfer Functions", Ch. 2 of Advances in Spectrum Analysis (S. Haykin, Ed.), Prentice-Hall, 1990, pp. 58–113.

D. J. Thomson, "Spectrum Estimation and Harmonic Analysis", Proceedings of the IEEE, vol. 70, No. 9, 1982, pp. 1055–1096.

(List continued on next page.)

*Primary Examiner*—James P. Trammell
*Assistant Examiner*—Bryan Bui

[57] ABSTRACT

A system and method are disclosed for detecting an event-related signal among noise, where the system includes memory for storing measurement values and may include a processor for generating residual values associated with the measurement values, and for detecting the event-related signal using the residual values.

60 Claims, 8 Drawing Sheets

OTHER PUBLICATIONS

D. J. Thomson, "Spectrum Estimation Techniques for Characterization and Development of WT4 Waveguide", Bell System Technical Journal, vol. 56, No. 9, 1977, Part I, pp. 1769–1815.

D. J. Thomson, "Spectrum Estimation Techniques for Characterization and Development of WT4 Waveguide", Bell System Technical Journal, vol. 56, No. 10, 1977, Part II, pp. 1983–2005.

D. J. Thomson et al., "Study of Tidal Periodicities Using a Trans–Atlantic Telecommunications Cable", Geophysical Research Letters, vol. 13, No. 6, 1986, p. 525–528.

SYSTEM AND METHOD FOR DETECTING A SIGNAL IN A NOISY ENVIRONMENT

BACKGROUND OF THE INVENTION

1. Field of the invention

This disclosure relates to the detection of signals, and particularly to the detection of a signal in a noisy environment.

2. Description of the Related Art

In physical environments having unpredictable events, such as earthquakes, tsunamis, solar activity, etc., such events generally generate electromagnetic signals which may be detected with appropriate equipment. Such events may also cause air or water pressure changes which may also be detected by appropriate equipment. Such detection of event-related signals is often difficult due to the inherent noise also originating from the physical environment of the event, from equipment effects, etc. Noise from all sources may be of such magnitude that, while event-related signals may originate from significant and even "Earth-shaking" events, the event-related signals may not be easily detected at the location of the detection equipment. In addition, such event-related signals may not exhibit regular or recognizable patterns so as to be generally indistinguishable from the noise of uneventful electromagnetic field fluctuations and pressure changes such as the regular motion of water currents, for example, tides or the Gulf Stream, near the detection equipment.

SUMMARY

It is recognized herein that the detection of event-related signals may be performed by predicting what the received signal should be as caused, for example, by electromagnetic noise over a duration of time. A system and method are disclosed for detecting an event-related signal among noise, where the system includes memory for storing measurement values; and means for generating residual values associated with the measurement values, and for detecting the event-related signal using the residual values.

BRIEF DESCRIPTION OF THE DRAWINGS

The features of the disclosed signal detection system and method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
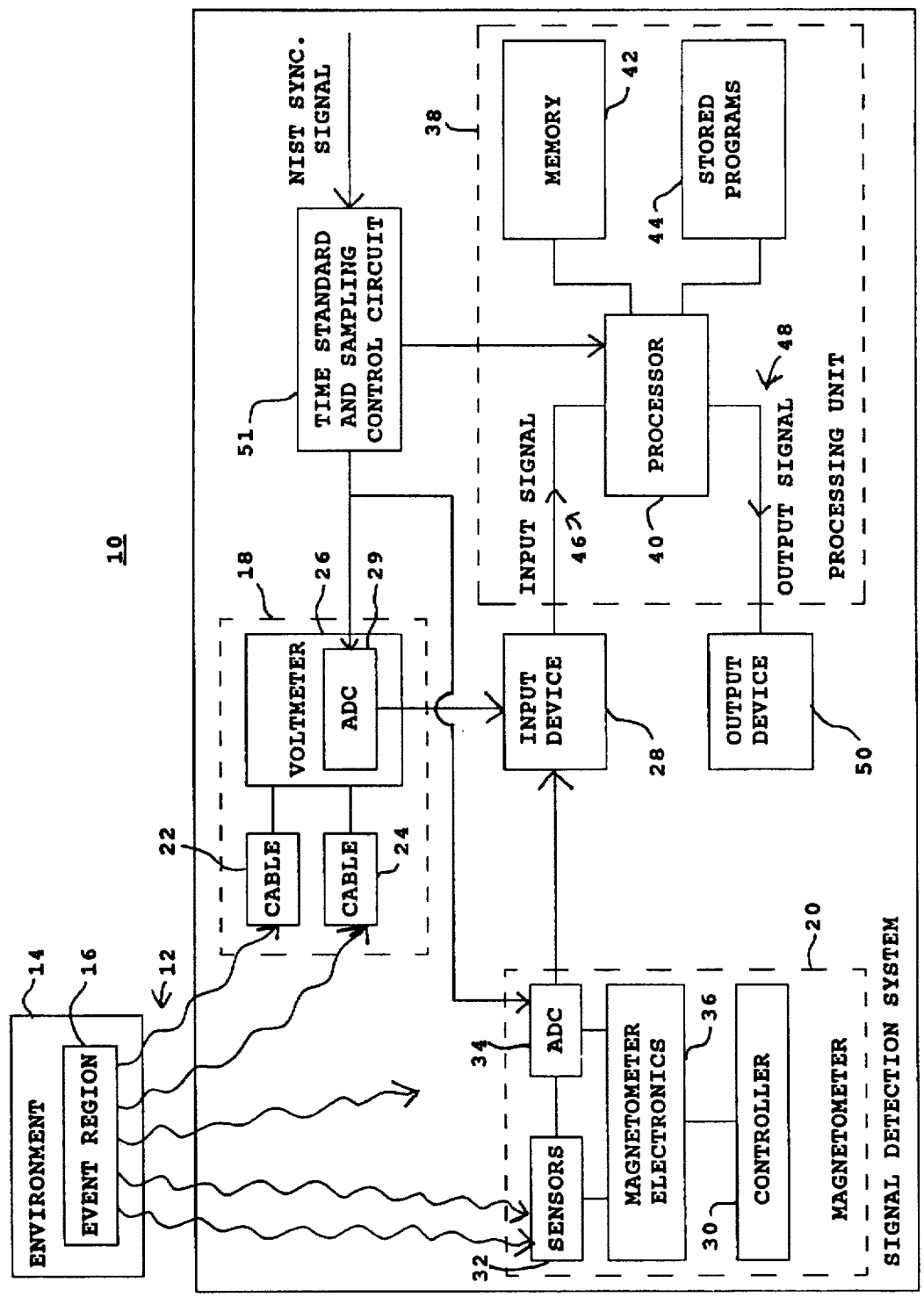
FIG. 1 illustrates a block diagram of the disclosed signal detection system for detecting event-related signals.

Referring now in specific detail to the drawings, with like reference numerals identifying similar or identical elements, as shown in FIG. 1, the present disclosure describes a signal detection system 10 and method for detecting event-related signals 12, such as signals caused by unpredictable events, from an environment 14 having an event region 16 and noise. The event-related signal 12 may include man-made sources of, for example, electromagnetic signals and/or pressure changes. The disclosed signal detection system 10 and method are herein described in an exemplary embodiment as shown in FIG. 1 for detecting an earthquake occurring under or near a body of water. Such an earthquake may cause a tsunami which moves the surrounding water in a relatively short duration of time, and such rapid water movement generates electromagnetic signals by the motion of ions in the water.

In the exemplary embodiment, the disclosed signal detection system 10 shown in FIG. 1 receives the event-related signals 12 at an electric field detector 18 and/or a magnetic field detector 20. The electric field detector 18 may include a plurality of cables 22, 24 operatively connected to a voltmeter 26 which measures the voltage potential of each cable 22, 24 relative to ground, and the measured voltages as electric field measurement signals are communicated to an input device 28 operatively connected to the voltmeter 26. The voltmeter 26 may also include an analog-to-digital converter (ADC), labelled 29, for converting the voltage measurements to digital signals, and the ADC 29 may also multiplex and sample the measured voltages at, for example, about 2 second intervals.

The magnetic field detector 20 may be a multiple-axis magnetometer such as a triple-axis fluxgate magnetometer having a controller 30 and a plurality of sensors 32 operatively connected to an ADC 34 and magnetometer electronics 36. The sensors 32 may be aligned to have three magnetic axes oriented along a geomagnetic south-north direction, a geomagnetic west-east direction, and a vertical direction to measure an X component, a Y component, and a Z component, respectively, with the Z component, for example, oriented in a right-handed reference system and being positive in value and increasing in a downward vertical direction. It is to be understood that such axes may be in any orientation, where the axes are non-coplanar.

The magnetometer electronics 36 process the sensor signals generated by the sensors 32 in response to the event-related signals, and use the ADC 34 to multiplex and sample the sensor signals at, for example, about 2 second intervals to generate magnetic field measurement signals communicated to the input device 28 operatively connected to the magnetic field detector 20.

The disclosed signal detection system 10 further includes a processing unit 38 having a processor 40 operatively connected to a memory 42 and stored programs 44. The processing unit 38 receives an input signal 46 from the input device 28 associated with the measured electric signals and magnetic signals, and the processor 40 processes the input signal 46 using the stored programs 44 to generate an output signal 48 indicative of detection of the event-related signal 12. For example, the output signal 48, which is received by an output device 50 from the processing unit 38, may indicate an approximate time of occurrence and/or other features of the event, such as intensity and duration of the event, which generates the event-related signal 12.

The disclosed signal detection system 10 may also include a time standard and sampling control circuit 51, which may be implemented by circuitry known in the art, for synchronizing the input signal 46 and the processing thereof by the processor 40 to a known time reference, such as the National Institute of Science and Technology (NIST) Universal Coordinated Time Standard, abbreviate as "UT" herein. As shown in FIG. 1, the time reference may be provided to the time standard and sampling control circuit 51 as an NIST synchronization signal. The time standard and sampling control circuit 51 may also be connected to the ADC 29 of the voltmeter 18 and to the ADC 34 of the magnetometer 20 for controlling the data sampling from the cables 22, 24 and the sensors 32, respectively, where the sampled data are used by the disclosed signal detection system 10 as described in greater detail below.

In an exemplary embodiment, the time standard and sampling control circuit 51 may be operatively connected to the components of the disclosed signal detection system 10, as shown in an exemplary embodiment in FIG. 1. It is understood that one skilled in the art may include the time standard and sampling control circuit 51 in the processing unit 38, or may include individual circuit modules in each component of the disclosed signal detection system 10 to perform the aforesaid functions of the time standard and sampling control circuit 51.

For clarity of explanation, the illustrative embodiment of the disclosed signal detection system and method is presented as having individual functional blocks, which may include functional blocks labelled as "processor", "processing unit", and "circuit". The functions represented by these blocks may be provided through the use of either shared or dedicated hardware, including, but not limited to, hardware capable of executing software. For example, the functions of the processor, processing unit, and time standard and sampling control circuit presented herein may be provided by a shared processor or by a plurality of individual processors. Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

In the exemplary embodiment, the input signal 46 from the input device 28 may also include data and commands obtained interactively from a user through the input device 28, which may include a serial port and connections to the electric field detector 18 and the magnetic field detector 20 as well as a keyboard, a mouse, and/or a data reading device such as a disk, optical, or CD-ROM drive for receiving the input signal 46 in input data files from storage media such as a floppy disk, CD-ROMs, or an 8 mm storage tape. For example, the historical and/or real-time electromagnetic noise for a geographic region may be obtained from any source such as real-time detectors and/or from the U.S. Government on CD-ROM. The input device 28 may also include a multiplexor for providing the various input signals to the processing unit 38.

In alternative embodiments, the input device 28 may include, for example, a modem for receiving the electric and magnetic data over telephone lines connecting the detectors 18, 20, where such detectors 18, 20 have corresponding modems for converting the electric and magnetic data to a format, such as the DTMF format, for transmission over the telephone lines. Alternatively, cables 22, 24 may also connect the input device 28 to the processing unit 38 for communicating the historical and/or real-time data.

The disclosed signal detection system 10 may also allow the user to input operating parameters such as a command instructing the disclosed detection system 10 to generate the output signal 48. In an exemplary embodiment, the processing unit 38 may be an INTEL™ PENTIUM™-based computer, or alternatively a SUN MICROSYSTEMS workstation, having about 64 MB associated RAM memory and a hard or fixed drive as memory 42. In the exemplary embodiment, the processor 40 operates application software as the stored programs 44 providing programs and subroutines implementing the disclosed signal detection system 10 and method.

The stored programs 44 include a main detection program which operates as described hereinbelow in conjunction with FIG. 11, implemented from compiled and/or interpreted source code in, for example, the FORTRAN programming language, and the main detection program may be downloaded to the processing unit 38 from an external computer. Alternatively, the source code may be implemented in the processing unit 38 as firmware, as an erasable read only memory (EPROM), etc. It is understood that one skilled in the art would be able to use other programming languages to implement the disclosed signal detection system 10 and method.

The generated output signal 48 may be in the form of a signal or file which is sent to an output device 50 such as a display for displaying the output signal 48, and/or a printer or plotter for generating a hardcopy printout or printed graphic of the output signal 48. The output device 50 may include specialized programs such as an output graphics tool to process and display and/or print the output signal 48. It is to be understood that the output device 50 may be either locally or remotely situated relative to the processing unit 38.

In an exemplary embodiment, the magnetic signal detector 20 may be a Model LNV-01 magnetometer, available from NANOTESLA, INC., and the ADC 34 may be a BURR BROWN Model PCI-20364M 16-bit integrating ADC having an input integration time of about 20 msec per channel input to generate digitized sensor signals for input to the input device 28.

The disclosed signal detection system and method may be used to detect event-related signals from tsunami caused by earthquakes. For example, using undersea cables as cables 22, 24 extending about 4050 kilometers under the Pacific Ocean from Hanauma Bay, Hawaii to Point Arena, Calif., and using a triple axis fluxgate magnetometer located at Point Arena as the magnetic signal detector 20, event-related signals originating from the April 1992 Cape Mendocino earthquake may be detected as disclosed herein from electric and magnetic field measurements obtained for a ten day interval prior to the earthquake and for a two day interval thereafter.

Figure 2:
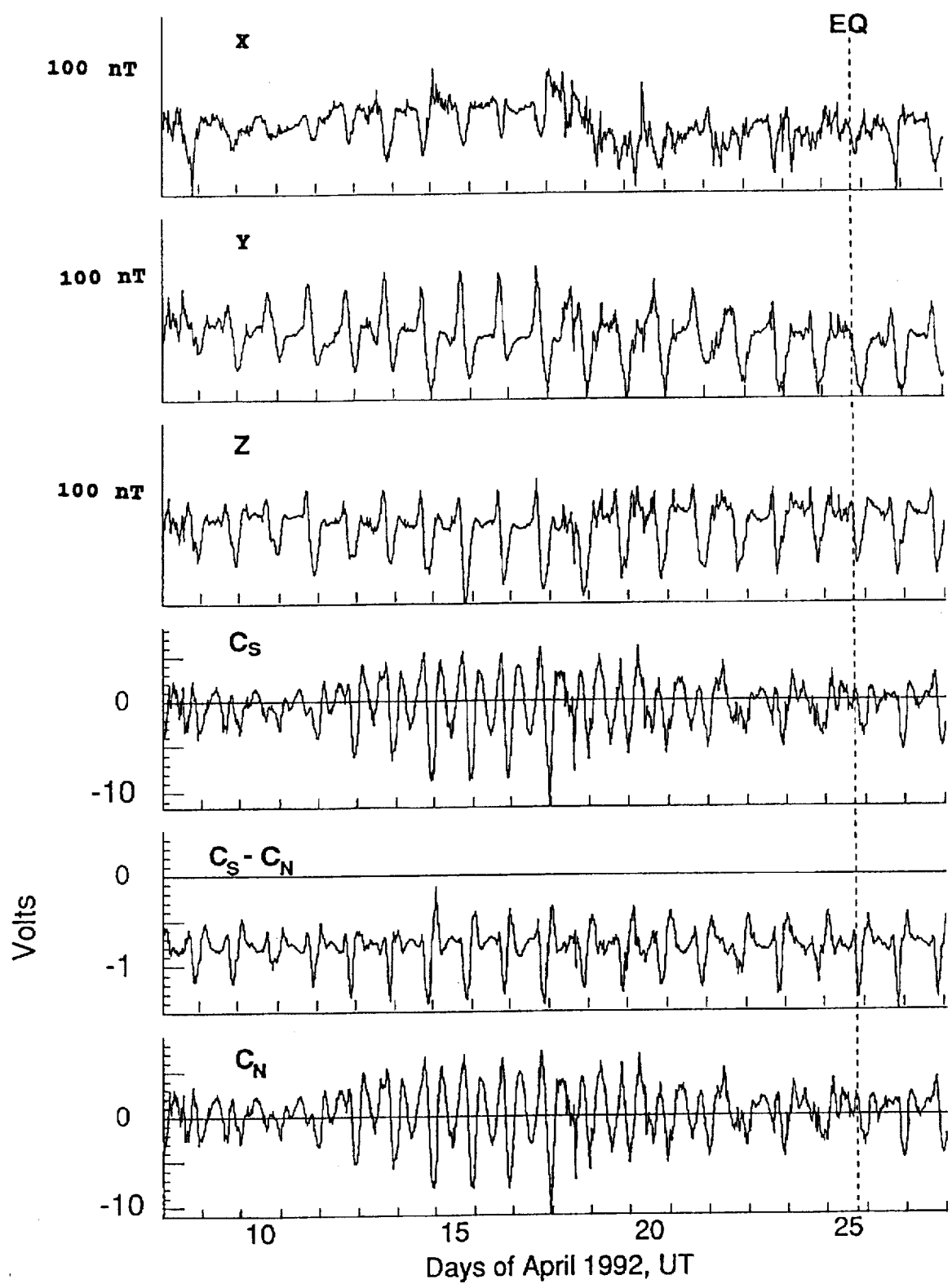
FIG. 2 is a set of graphs of electric and magnetic field measurements.

As shown in FIG. 2, the electric and magnetic field measurements are plotted for days and times in April 1992, with the daily times measured in Universal Time (UT). The X, Y, and Z components in the upper three plots are measured in nanoteslas, and the potentials of a south cable $C_s$, a north cable $C_N$, and their difference $C_s-C_N$ in the lower three plots are measured in volts. The common vertical labelled "EQ" indicates the occurrence of the Cape Mendocino earthquake. The plots of FIG. 2 reflect daily solar magnetic field variations as well as electric fields from daily ocean tides and solar ionospheric effects.

For detecting event-related signals among the electromagnetic noise, for example, from regular geophysical sources such as ocean tides and solar effects, such electromagnetic noise may be predicted using transfer functions between the magnetic field components and the cable voltages V including noise by using residuals. In particular, time-domain estimates of the impulse responses are performed using approximately exponentially-spaced time steps, as described below.

For relatively accurate predictions of the noise, the weighted square prediction residuals are determined such that the cost factor $C_F$:

$$C_F = \sum_{t=T_0}^{T_1} w(t) [\delta V(t)]^2 \tag{1}$$

is minimized, where $T_0$ and $T_1$ represent the start and end times, respectively, of a fitting interval, and w(t) is a weight which may be, for example, a function of the prediction errors, or alternatively may be Huber weights, as known in the art. The residual, $\delta V(t)$, is the difference between observed and predicted voltages:

$$\delta V(t) = V(t) - \hat{V}(t) \tag{2}$$

The prediction, $\hat{V}(t)$, may be represented as the sum of two terms:

$$\hat{V}(t) = \sum_{k=1}^{P} a_k V(t - \tau_k) + \sum_{m=1}^{M} \sum_{j=1}^{J} \beta_{m,j} B_m(t - \xi_j) \tag{3}$$

where the first term on the right side of Equation (3) is an autoregressive term on the previous values of the voltage, and the second term on the right side expresses the contribution of magnetic induction from the magnetic fields. The error of such a prediction according to Equation (3) above may be minimized using robustified least squares methods known in the art.

In the autoregressive term in Equation (3), the $a_k$ values are coefficients used to predict the cable voltage from the cable voltage at $\tau_k$ samples earlier. In the induction term in Equation (3), $B_m(t)$ is the magnetic field data for each magnetic field component, and M is the number of magnetic field components used, which may be, for example, three field components from the triple-axis magnetic field detector 20 of FIG. 1.

The $\beta_{m,j}$ values represent the regression coefficients from the magnetic field components $B_m$ at time $t-\xi_j$ onto the voltage at time t. In an exemplary embodiment, P=4 autoregressive delays may be used with values of $\tau_k$ minutes with $\tau_k \in \{8, 15, 30, 60\}$, and J=11 coefficients at delays of $\xi$ minutes with $$\xi \in \{-60, -30, -8, -2, 0, 2, 4, 8, 15, 30, 60\}$$

for each of the magnetic field components.

Defining $$A(\omega) = 1 - \sum_{k=1}^{P} a_k e^{-i\omega \tau_k} \tag{4}$$

then the overall transfer function from magnetic field components $B_m$ to V is given by:

$$H_m(\omega) = \frac{\sum_{j=1}^{J} \beta_{m,j} e^{-i\omega \xi_j}}{A(\omega)} \tag{5}$$

Using the time-domain estimate according to Equation (5), the variance of the residual cable voltage may be about 200 times smaller than the variance of the raw cable voltage, and the range of a corresponding power spectrum may be reduced by a factor of about 500.

Figure 3:
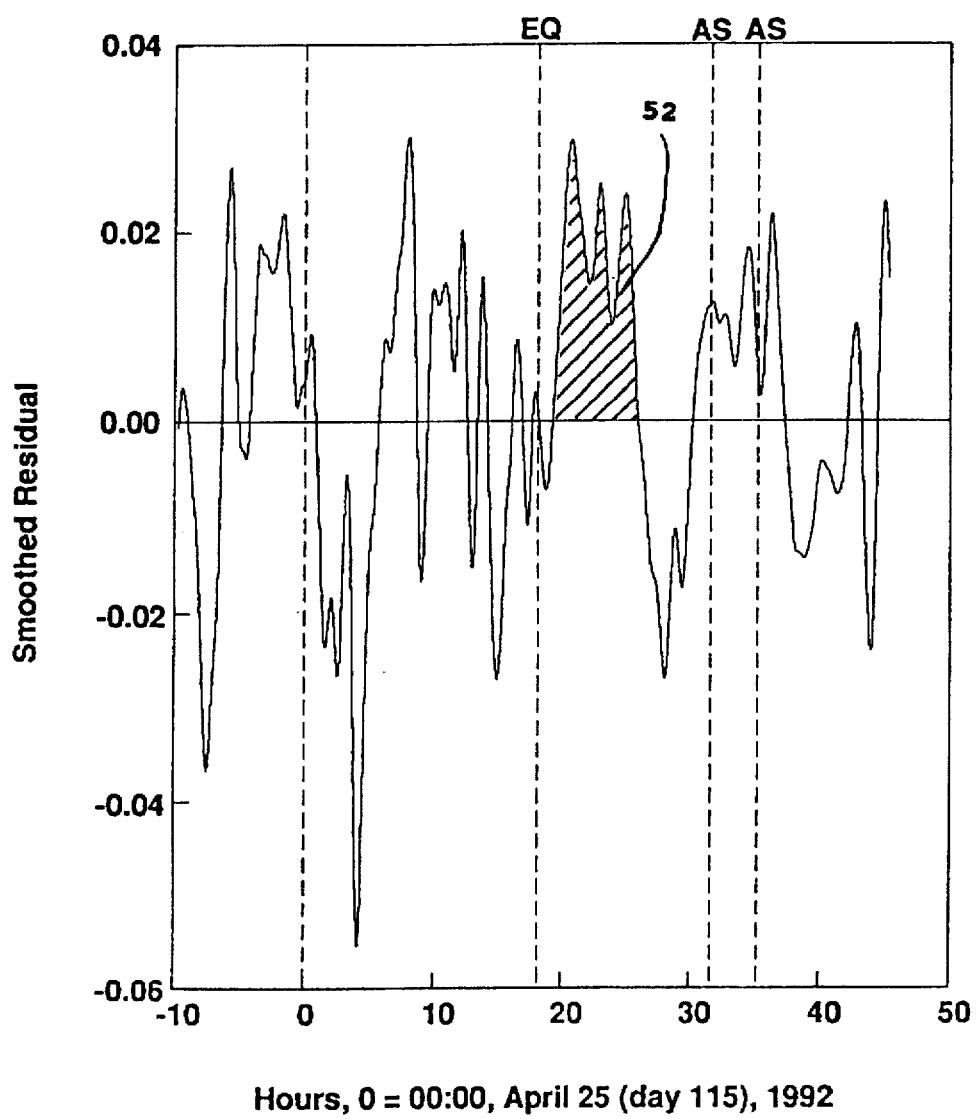
FIG. 3 is a graph of smoothed residuals.

The processor 40 then generates smoothed residuals as shown, for example, in FIG. 3, using a parabolic tapered window with a two hour time span. While the electromagnetic noise shows substantial fluctuation of the residuals about the null line, the residual behavior following the earthquake and prior to a first aftershock, labelled "AS", may be substantially of one sign for an extended interval, and may appear as indicated in the shaded region 52. In addition, the mean value of such post-earthquake residuals for the interval may be considerably enhanced compared to the mean value for other intervals of comparable interval length.

The residuals for possible aftershocks may also exhibit such enhanced behavior relative to the noise. Accordingly, the processor 40 may generate event-related residuals corresponding to event-related signals according to Equations (1)–(5), then smooth the residuals and determine the times wherein the absolute values of the residuals are above a predetermined threshold. For example, the processor 40 may determine such event-related residuals using a moving window of about 6 hours and a threshold of 0.01 volts, such as shown in FIG. 3. The main earthquake may then be detected as well as possible aftershocks.

Alternatively, the disclosed signal detection system 10 and method may also detect the event-related signals using the integral of the squared power spectra over all frequencies within a given Nyquist band:

$$V_V(t) = \int_{\forall f} S^2(f, t) df \tag{6}$$

for the residuals for windows of time intervals, where S is the power spectrum, f is the frequency, V is the voltage, and $V_v$ is the asymptotic variance. In an exemplary embodiment, individual spectra for intervals of 6 hours are determined by the processor 40 from 1 minute residual values using a multi-window estimate technique with a time-bandwidth product equal to 4.0 and with 5 windows on each block of residual values. In an exemplary embodiment, such a multi-window estimate technique may be the technique described in commonly assigned U.S. patent application No. 07/816,332, filed Dec. 31, 1991, and entitled METHOD AND APPARATUS FOR DETECTING CONTROL SIGNALS, which is incorporated herein by reference.

In an exemplary embodiment, the time window for a 6 hour spectrum is advanced or slid by, for example, 30 minutes before calculating the subsequent spectrum. Such an integral of the squared spectra as plotted in FIG. 4 has peaks labelled A, B in FIG. 4 indicative of the earthquake EQ. Accordingly, the processor 40 may determine the presence of an event-related signal from the integrated squared spectrum being above a predetermined threshold, such as, for example, $1.7 \times 10^{-7}$.

The integral of the squared spectra also indicates the stability of the power estimates. In addition, the functionals of a spectrum, such as the average over frequency, the geometric mean, and the harmonic mean, may have physical interpretations. For example, the average over frequency is a process variance, the geometric mean is a one-step prediction variance, and the harmonic mean is a single-sample interpolation variance. In the exemplary embodiment, $V_v$ in Equation (6) is defined as an asymptotic variance of a sample variance, which is a measure of the reliability of a power estimate.

Alternatively, since the peaks in the integral of the squared power spectrum may be caused by noise such as regular geomagnetic events including increased solar activity, the disclosed signal detection system 10 and method uses cepstral analysis of the peaks to eliminate such noise as false candidates for event-related signals. The disclosed signal detection system 10 and method generates a multi-window estimate of the power spectrum for those residuals occurring in time intervals having such peaks. For example, the time intervals of 1840–2440 UT 25 April and 0410–1010 UT 26 April corresponding to intervals including peaks A and B, respectively, in FIG. 4 are processed to generate power spectra for peaks A and B, as shown in FIGS. 5–6, respectively.

Figure 4:
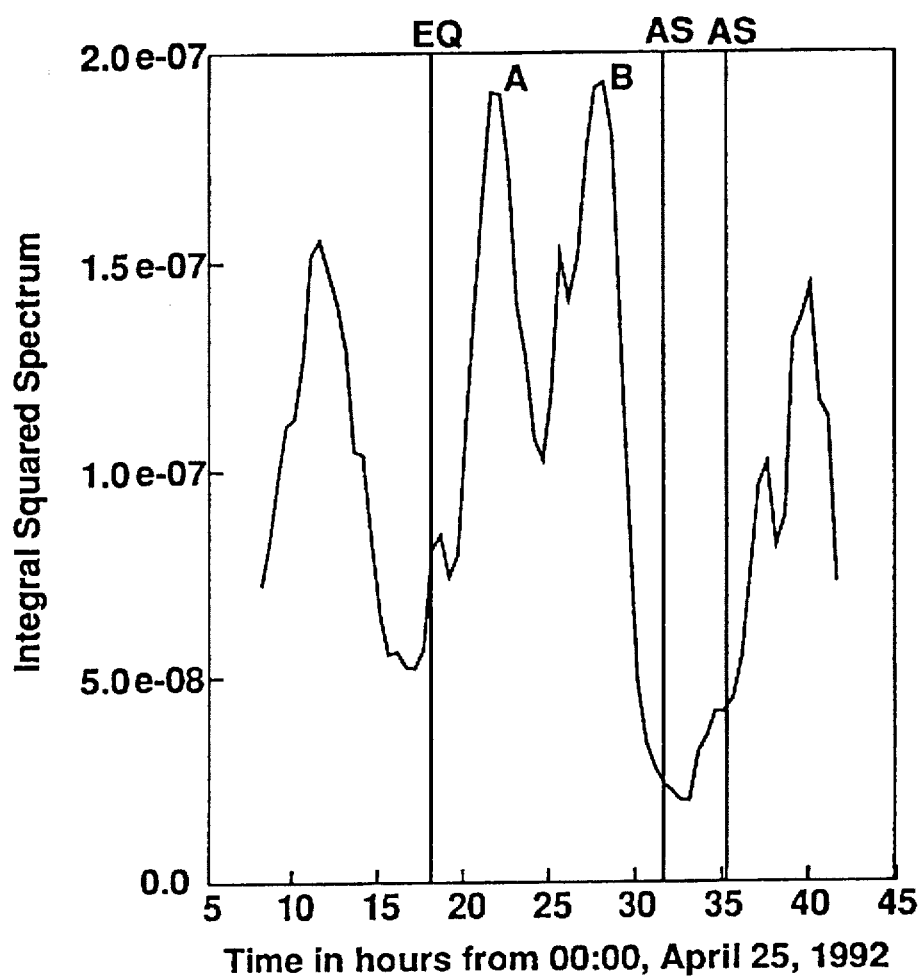
FIG. 4 is a graph of an integral of squared spectra of the residuals.
Figures 5, 7:
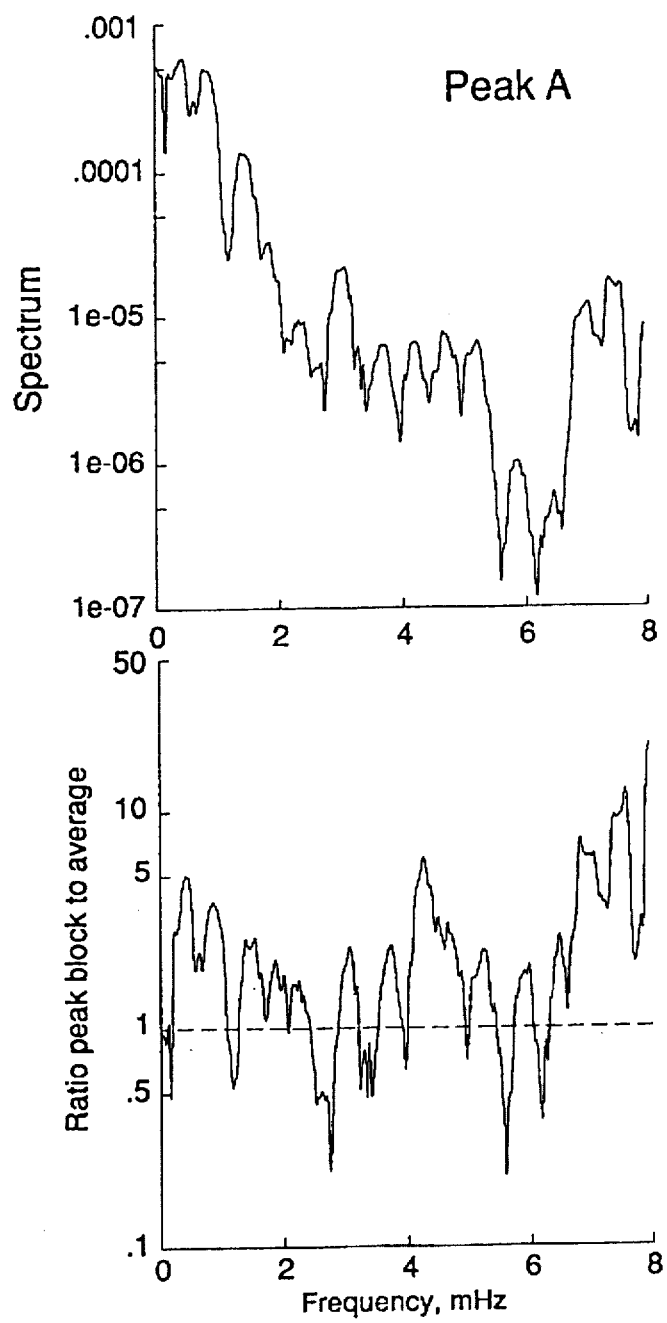
FIGS. 5-6 are graphs of power spectra of peaks of the graph of FIG. 4.
FIGS. 7-8 are graphs of ratio values associated with the graphs shown in FIGS. 5-6, respectively.
Figures 6, 8:
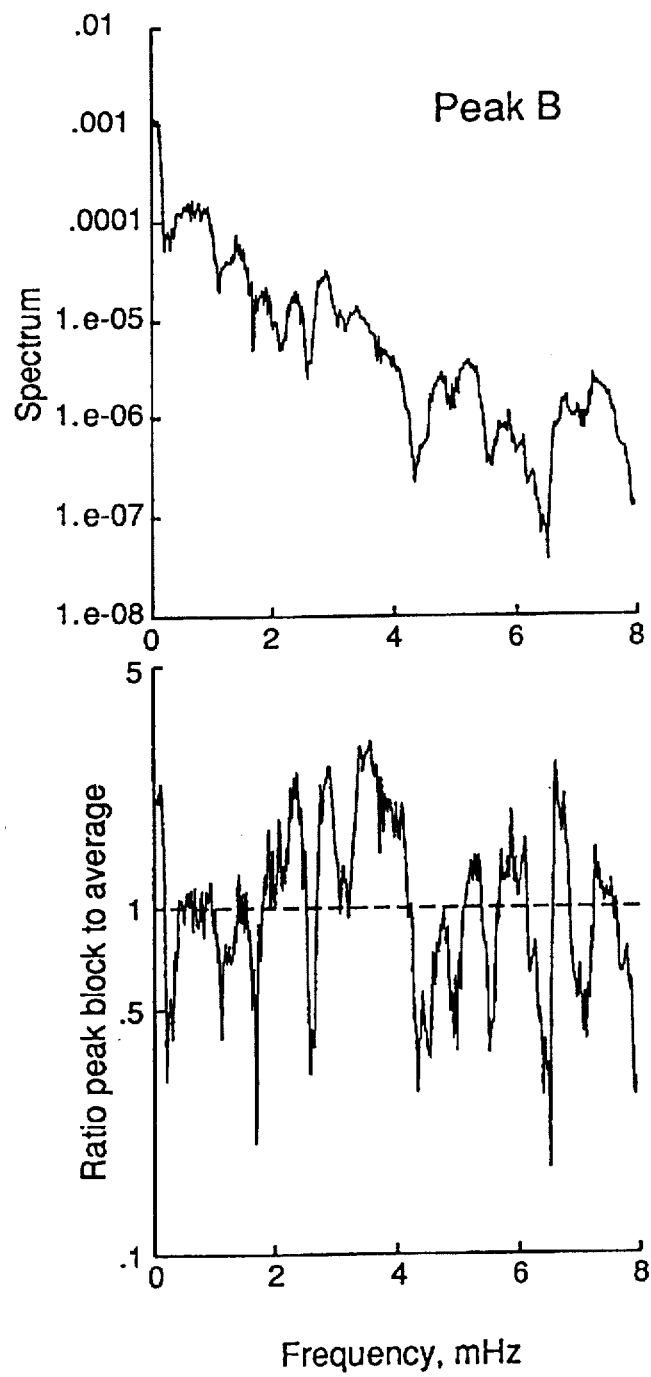

The processor 40 then ratios each spectra in FIGS. 5–6 to be a function of frequency to the average residual power spectrum for a time interval including peaks A and B, such as the time interval from 0500 UT 25 April to 1800 UT 26 April, as shown in FIG. 4, where 1800 UT 26 April corresponds to the time of 37 hours on the time scale of FIG. 4. The ratio plots of the residual spectral values from the intervals of peaks A and B, respectively, to the average residual power spectrum are shown in FIGS. 7–8, respectively, for frequencies of 0 mHz to 8 mHz.

Figure 9:
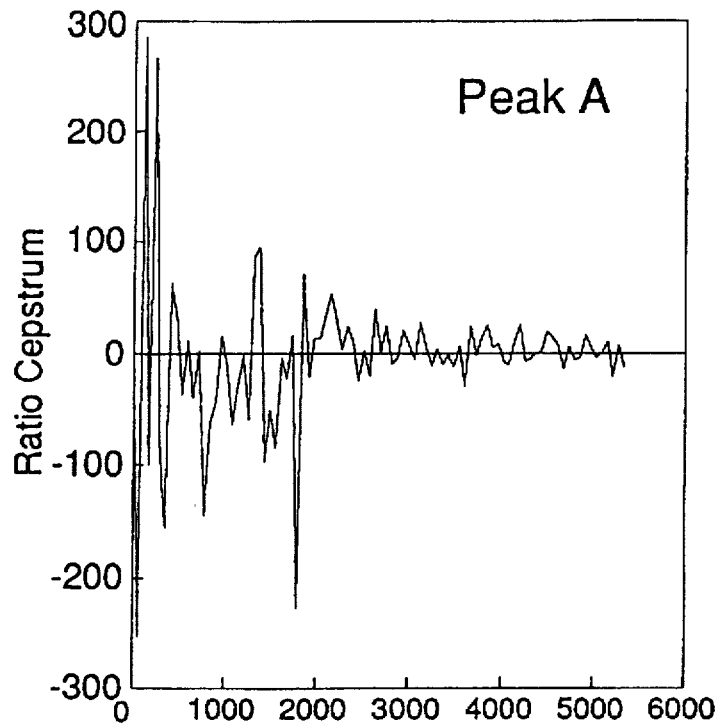
FIGS. 9-10 are graphs of cepstra associated with FIGS. 7-8, respectively.
Figure 10:
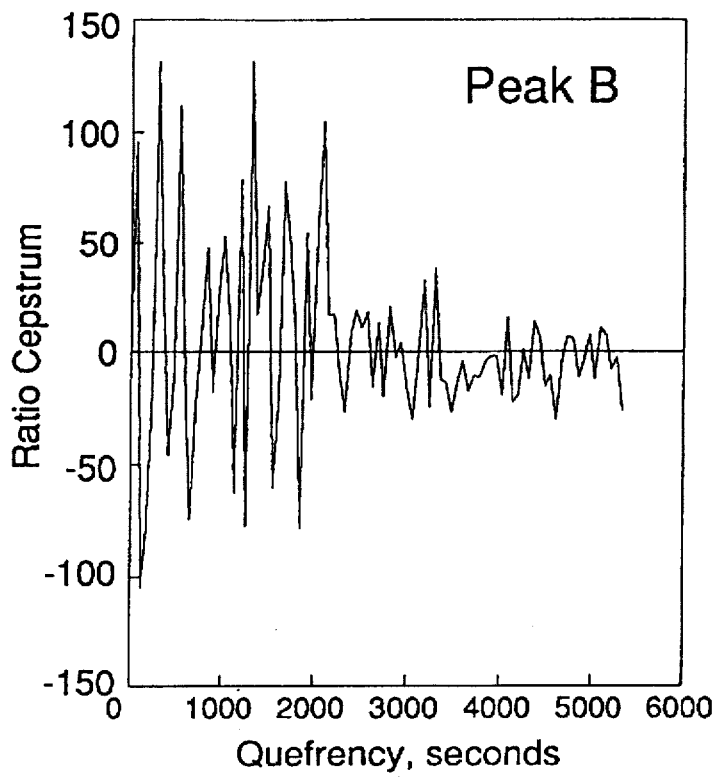

The cepstrum is the inverse Fourier transform of the logarithm of the Fourier power spectrum of a signal. In the exemplary embodiment, the cepstrum of each of the ratio plots shown in FIGS. 7–8 are determined for the 0–8 mHz frequency range. The cepstrum of FIG. 7 is illustrated in FIG. 9 for Peak A of FIG. 4, and the cepstrum of FIG. 8 is illustrated in FIG. 10 for Peak B of FIG. 4. In terms of absolute values of the cepstrum plots, FIGS. 9–10 show large cepstrum values at very low quefrencies, with quefrencies less than 250 seconds. The processor 40 may ignore such large cepstrum values as corresponding to very low frequencies which may correspond to noise.

The processor 40 then detects the presence of large absolute values of the cepstrum plots, such as absolute ratio cepstrum values greater than a threshold of 50, for quefrencies greater than a predetermined quefrency, such as 250 seconds. For example, in FIGS. 9–10, large absolute values of the cepstrum are shown to be at quefrencies of about 30 minutes in FIG. 9, and about 20–35 minutes in FIG. 10. Such large cepstrum peaks may be attributed to an "echo" in the event-related signal detected by the cables 22, 24 of the disclosed signal detection system 10 and method. The echo may be a first event-related signal detected by the cables 22, 24 and being matched with a second event-related signal detected in the interval of the candidate peaks A and B and being out of phase with the first event-related signal.

Such echoes from multiple detected event-related signals may be attributed to the event; i.e. the earthquake and/or the resulting tsunami wave process. Accordingly, for candidate peaks detected in the integral squared spectrum of FIG. 4 which do not have relatively large peaks in the absolute values of their ratio cepstrum, such candidate peaks may be disregarded as peaks associated with event-related signals.

Figure 11:
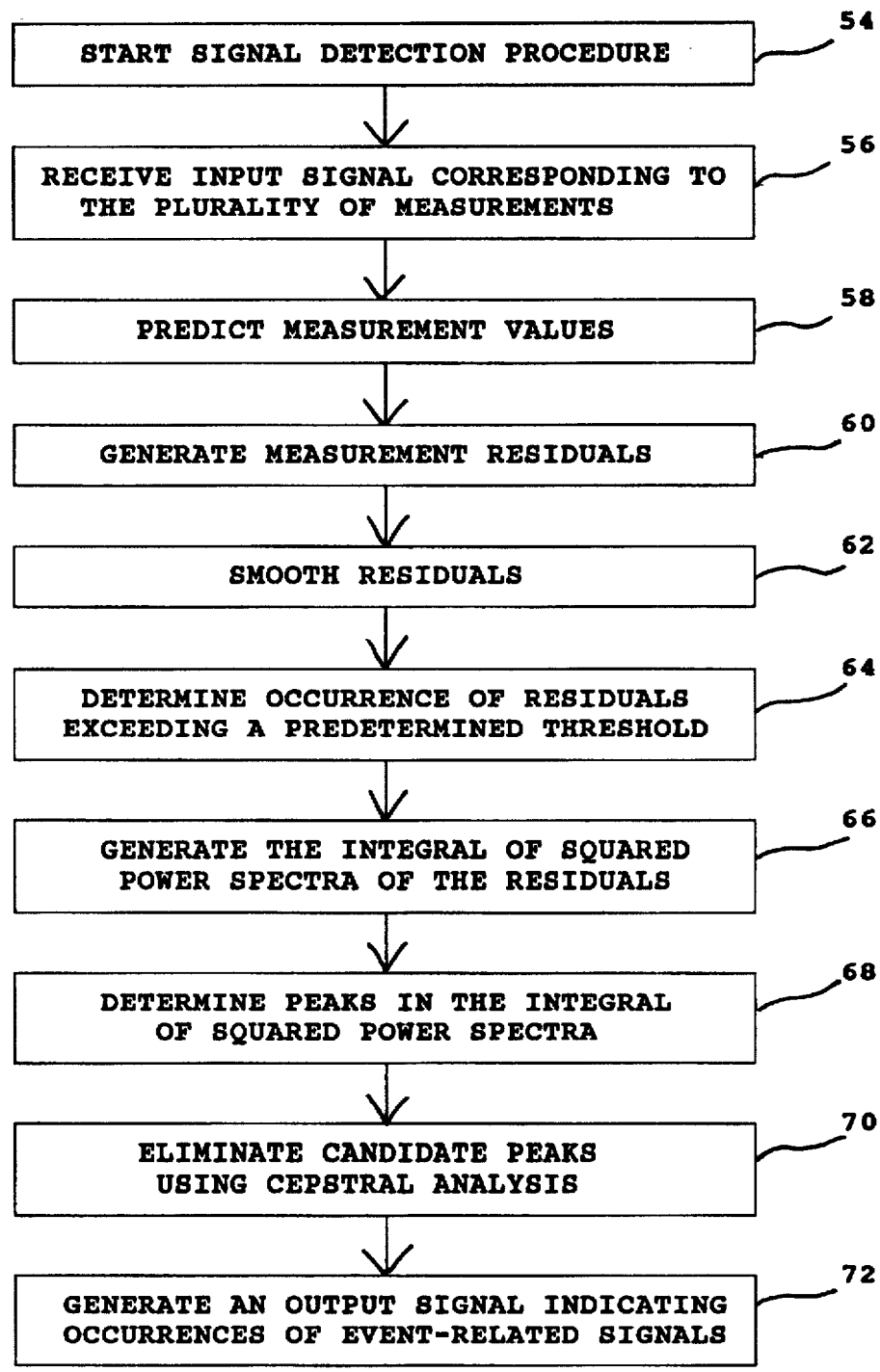
FIG. 11 shows a flowchart of a main operating procedure of the disclosed signal detection system and method.

In use, the disclosed signal detection system 10 operates the signal detection program according to the method shown in FIG. 11, in which the signal detection program stores a signal detection procedure in step 54, and receives the input signal 46 through the input device 28 in step 56 corresponding to the event-related signal 12 and noise detected and measured by the detectors 18–20 of FIG. 1, where the input signal corresponds to the plurality of electric and magnetic field measurements of the detectors 18–20. The method then predicts measurement values in step 58 by applying the measurement values to a transfer function according to Equation (5) as determined from autoregressive terms $a_k$ and regression coefficients $\beta_{mj}$.

The method generates measurement residuals $\delta V(t)$ in step 60 using the predicted and actual measurement values, and then smoothes the residuals in step 62 using, in an exemplary embodiment, a parabolic tapered window. In the exemplary embodiment, the method performs steps 62–70 to determine candidates as event-related signals. The method determines the occurrence in step 64 of any residuals exceeding a predetermined threshold, and generates the integral of squared power spectra of the residuals in step 66. The method then determines peaks in the integral of squared power spectra in step 68, and eliminates candidate peaks in step 70 using cepstral analysis. An output signal is then generated in step 72 representing the times of occurrence of the event-related signals which correspond to such excessive residuals and which have peaks in their integral of squared power spectra that have not been eliminated by cepstral analysis.

While the disclosed signal detection system and method have been particularly shown and described with reference to the preferred embodiments, it is understood by those skilled in the art that various modifications in form and detail may be made therein without departing from the scope and spirit of the invention. For example, the disclosed signal detection system and method may also be applied using detectors for detecting electromagnetic signals from man-made sources and objects, including ship propellers, and for detecting ionic and sub-atomic particles, etc., as well as atmospheric, geologic, and oceanic pressure changes, including nuclear testing. Accordingly, modifications such as those suggested above, but not limited thereto, are to be considered within the scope of the invention.

What is claimed is:

1. A method for identifying the occurrence of an event which produces an electromagnetic disturbance within a region of the earth, the method comprising the steps of:

receiving signals appearing on a utility cable which extends through said region of the earth;

receiving environmental measurements from a device which detects electromagnetic signals in a given environment remote from said electromagnetic disturbance; and analyzing said environmental measurements and said signals to detect the occurrence of the event.

2. The method of claim 1 further comprising the step of measuring a property of said signals appearing on said utility cable to obtain measured values.

3. The method of claim 2 wherein said property of said signals on said utility cable is electrical potential.

4. The method of claim 2 further comprising the step of storing, in a memory, a set of said measured values and a set of said environmental measurements, that were concurrently obtained during a period of time before the occurrence of the event, to establish a database.

5. The method of claim 4 wherein said step of analyzing said measurements comprises the steps of:

receiving, during the occurrence of the event, said environmental measurements, from said device to obtain a set of current environmental measurements;

generating a set of predicted values, of the property of said signals appearing on said utility cable, based on said current environmental measurements and said database;

measuring said signals appearing on said utility cable, during the occurrence of the event, to obtain current property measurements; and generating a set of residual values based on said current property measurements and said set of predicted values.

6. The method of claim 5 further comprising the step of analyzing said set of residual values in such a way as to detect the occurrence of the event.

7. The method of claim 6 wherein said step of analyzing said set of residuals comprises the step of identifying a sub-set of residual values exceeding a predetermined residue threshold.

8. The method of claim 6 wherein said step of analyzing said set of residuals comprises the step of filtering said set of residuals to identify the time and duration of the electromagnetic disturbance produced by the event.

9. The method of claim 8 wherein said step of filtering comprises the steps of:
generating an integral of squared power spectra of the set of residuals;
determining peaks in said integral of squared power spectra; and
performing cepstral analysis on said peaks to eliminate a set of residuals related to noise.

10. The method of claim 8 further comprising the step of analyzing said filtered set of residuals to identify the type of event associated with the electromagnetic disturbances.

11. The method of claim 10 wherein said event is a Tsunami.

12. A method for identifying the occurrence of an event which produces an electromagnetic disturbance within a region of the earth, the method comprising the steps of:
measuring the electrical potential across a section of the earth to obtain a set of measured values, said section of the earth including the region of the earth in which the event produces the electromagnetic disturbance;
detecting electromagnetic signals, in a given environment remote from said electromagnetic disturbance, to obtain a set of stored values; and
analyzing said set of measured values and said set of stored values to detect the occurrence of the event.

13. The method of claim 12 wherein said step of analyzing comprises the steps of:
generating a set of residual values based on said set of stored values and said set of measured values; and
analyzing said set of residual values in such a way as to detect the occurrence of the event.

14. The method of claim 13 wherein said step of analyzing said residual values comprises the step of identifying a sub-set of residual values exceeding a predetermined residue threshold.

15. The method of claim 13 wherein said step of analyzing said residual values comprises the step of filtering said set of residual values to identify the time and duration of the electromagnetic disturbance produced by the event.

16. The method of claim 15 wherein said step of filtering comprises the steps of:
generating an integral of squared power spectra of the set of residual values;
determining peaks in said integral of squared power spectra; and
performing cepstral analysis on said peaks to eliminate a set of residual values related to noise.

17. The method of claim 15 further comprising the step of analyzing said filtered set of residual values to identify the event associated with the electromagnetic disturbances.

18. The method of claim 17 wherein said event is a Tsunami.

19. A method for detecting an event-related signal comprising the steps of:
generating residual values from a set of measurement values associated with an event-related signal; and
determining a first condition of a first peak of an integral of squared power spectra of the residual values exceeding a first predetermined threshold to detect the event-related signal therefrom.

20. The method of claim 19 further including, after the step of determining the first condition, the steps of
performing cepstral analysis of the first peak; and
determining a second condition of a cepstral peak exceeding a second predetermined threshold to confirm detection of the event-related signal.

21. An apparatus for identifying the occurrence of events which produce electromagnetic disturbances within a region of the earth, the apparatus comprising:
means for receiving signals appearing on a utility cable which extends through said region of the earth; and
means for receiving environmental measurements from a device which detects electromagnetic signals in an environment remote from said electromagnetic disturbance;
means for analyzing said signals appearing on said utility cable and said measurements to detect the occurrence of the event.

22. The apparatus of claim 21 further comprising means for measuring a property of said signals appearing on said utility cable.

23. The apparatus of claim 22 wherein said property is electrical potential.

24. The apparatus of claim 22 further comprising a memory for storing measurements of said property of said signals and said environmental measurements, that were concurrently received during a period of time before the occurrence of the event, to establish a database.

25. The apparatus of claim 24 wherein said means for analyzing said measurements comprises:
means for receiving, during the occurrence of the event, said environmental measurements from said device to obtain a set of current environmental measurements;
means for generating a set of predicted values, of the property of said signals appearing on said utility cable, based on said database and said current environmental measurements;
means for measuring said signals appearing on said utility cable, during the occurrence of the event, to obtain current property measurement; and
means for generating a set of residual values based on said current property measurements and said set of predicted values.

26. The apparatus of claim 25 further comprising means for analyzing said set of residual values in such a way as to detect the occurrence of the event.

27. The apparatus of claim 26 wherein said means for analyzing said set of residuals comprises means for identifying a sub-set of residual values exceeding a predetermined residue threshold.

28. The apparatus of claim 26 wherein said means for analyzing said set of residuals comprises means for filtering said set of residuals to identify the time and duration of the electromagnetic disturbance produced by the event.

29. The apparatus of claim 28 wherein said means for filtering comprises:
means for generating an integral of squared power spectra of the set of residuals;

means for determining peaks in said integral of squared power spectra; and means for performing cepstral analysis on said peaks to eliminate a set of residuals related to noise.

30. The apparatus of claim 28 further comprising means for analyzing said filtered set of residuals to identify the type of event associated with the electromagnetic disturbances.

31. The apparatus of claim 30 wherein said event is a Tsunami.

32. An apparatus for identifying the occurrence of an event which produces an electromagnetic disturbance within a region of the earth, the apparatus comprising:

means for measuring the electrical potential across a section of the earth to obtain measured values, said section of the earth including the region of the earth in which the event produces the electromagnetic disturbance;

means for detecting electromagnetic signals, in a given environment remote from said electromagnetic disturbance, to obtain a set of stored values; and means for analyzing said set of stored values and said set of measured values in such a way as to detect the occurrence of the event.

33. The apparatus of claim 32 wherein said step of analyzing comprises means for generating a set of residual values based on said set of stored values and said set of measured values, and means for analyzing said set of residual values in such a way as to detect the occurrence of the event.

34. The apparatus of claim 33 wherein said means for analyzing said residual values comprises means for identifying a sub-set of residual values exceeding a predetermined residue threshold.

35. The apparatus of claim 34 wherein said means for analyzing said set of residual values comprises means for filtering said set of residual values to identify the time and duration of the electromagnetic disturbance produced by the event.

36. The apparatus of claim 35 wherein said means for filtering comprises:

means for generating an integral of squared power spectra of the set of residual values;

means for determining peaks in said integral of squared power spectra; and means for performing cepstral analysis on said peaks to eliminate a set of residual values related to noise.

37. The apparatus of claim 35 further comprising means for analyzing said filtered set of residual values to identify the event associated with the electromagnetic disturbances.

38. The apparatus of claim 37 wherein said event is a Tsunami.

39. A system for identifying the occurrence of events which produce electromagnetic disturbances within a region of the earth, the system comprising:

a receiver for receiving signals appearing on a utility cable which extends through said region of the earth;

a detector for receiving environmental measurements from a device which detects electromagnetic signals in an environment remote from said electromagnetic disturbance; and a processor for analyzing said signals appearing on said utility cable and said environmental measurements to detect the occurrence of the events.

40. The system of claim 39 further comprising a measurement device for measuring a property of said signals appearing on said utility cable.

41. The system of claim 40 wherein said processor is further operable to generate a set of predicted values based on previous said environmental measurements, previous measurements of said property of said signals, and said environmental measurements made during the occurrence of the event.

42. The system of claim 41 wherein said processor is further operable to generate a set of residual values based on said predicted values and a set of measurements of said property of said signals.

43. The system of claim 42 wherein said processor is operable to analyze said residual values through means for filtering said set of residual values to identify the time and duration of the electromagnetic disturbance produced by the event.

44. The system of claim 43 wherein said means for filtering comprises:

means for generating an integral of squared power spectra of the set of residual values;

means for determining peaks in said integral of squared power spectra; and means for performing cepstral analysis on said peaks to eliminate a set of residual values related to noise.

45. The system of claim 43 further comprising means for analyzing said filtered set of residual values to identify the type of event associated with the electromagnetic disturbances.

46. The system of claim 45 wherein said event is a Tsunami.

47. A system for identifying the occurrence of an event which produces an electromagnetic disturbance within a region of the earth, the system comprising:

means for measuring the electrical potential across a section of the earth to obtain measured values, said section of the earth including the region of the earth in which the event produces the electromagnetic disturbance;

means for detecting electromagnetic signals, in a given environment remote from said electromagnetic disturbance, to obtain a set of stored values; and means for analyzing said set of stored values and said set of measured values to detect the occurrence of the event.

48. The system of claim 47 wherein said means for analyzing comprises means for generating a set of residual values based on said set of stored values and said set of measured values; and means for analyzing said set of residual values in such a way as to detect the occurrence of the event.

49. The system of claim 48 wherein said means for analyzing said residual values comprises means for identifying a sub-set of residual values exceeding a predetermined residue threshold.

50. The system of claim 49 wherein said means for analyzing said set of residual values comprises means for filtering said set of residual values to identify the time and duration of the electromagnetic disturbance produced by the event.

51. The system of claim 50 wherein said means for filtering comprises:

means for generating an integral of squared power spectra of the set of residual values;

means for determining peaks in said integral of squared power spectra; and means for performing cepstral analysis on said peaks to eliminate a set of residual values related to noise.

52. The system of claim 50 further comprising means for analyzing said filtered set of residual values to identify the event associated with the electromagnetic disturbances.

53. The system of claim 52 wherein said event is a Tsunami.

54. A system for detecting an event-related signal comprising:

memory for storing measurement values; and means for generating residual values associated with the measurement values, and for detecting the event-related signal using the residual values, said means being responsive to a signal detection program for determining a condition of a first peak of an integral of squared power spectra of the residual values exceeding a predetermined threshold to detect the event-related signal therefrom.

55. The system of claim 54 wherein the means for generating, in response to the exceeding of the first predetermined threshold by the first peak, performs cepstral analysis of the first peak to determine a condition of a cepstral peak exceeding a second predetermined threshold to confirm detection of the event-related signal.

56. A system for detecting an event-related electromagnetic signal associated with a tsunami comprising:

a detector for detecting and measuring a plurality of electromagnetic signals, including the event-related electromagnetic signal, to obtain a plurality of measurement values over an interval of time; and a processing unit including:

memory and stored programs, including a signal detection program, for receiving and storing the plurality of measurement values; and a processor responsive to the signal detection program for generating residual values associated with the plurality of measurement values, and for detecting the event-related electromagnetic signal among the plurality or electromagnetic signals using the residual values, said processor being responsive to the signal detection program for detecting a condition for each of a plurality of peaks of an integral of squared power spectra of the residual values exceeding a first predetermined threshold to detect the event-related electromagnetic signal therefrom as associated with a set of peaks exceeding a first predetermined threshold.

57. The system of claim 56 wherein the processor, in response to the exceeding of the first predetermined threshold set by the set of peaks, performs cepstral analysis of the set of peaks to determine a condition of a cepstral peak generated from the set of peaks as exceeding a second predetermined threshold to confirm detection of the event-related electromagnetic signal by elimination of false candidates from the set of peaks.

58. A method for detecting an event-related signal that propagates in an environment between a detector equipment location and a remote location, the method comprising the steps of:

detecting electromagnetic signals propagating in the environment of the detector equipment location to store said environmental measurements over a period of time;

determining a set of expected values based on said environmental measurements, said expected values being a prediction of a difference in electrical potential, across a section of the earth between the detector equipment location and the remote location;

measuring the electrical potential across the section of the earth between the detector equipment location and the remote location to determine measured values of the difference in electrical potential therebetween;

generating a set of residual values based on said set of expected values and said set of measured values; and analyzing said set of residual values to detect the event-related signal.

59. An apparatus for detecting an event-related signal propagating in an environment between the location of the apparatus and a remote location, the apparatus comprising:

a detector for measuring electromagnetic signals propagating in the environment of the location of the apparatus;

a processor operable to determine, based on said measured electromagnetic signals, a set of expected values of the electrical potential across a section of the earth between said location of the apparatus and the remote location; and a detector for measuring the electrical potential across said surface of the earth between the location of the apparatus and the remote location; and said processor being further operable to determine a set of residual values based on said electrical potential measurements and said set of expected values, analyze said set of residual values to detect the event-related signal.

60. A system for detecting an event-related signal that propagates in an environment between a detector equipment location and a remote location, the system comprising:

means for detecting, over a period of time, electromagnetic signals propagating in the environment of the detector equipment location;

means for storing measurements of said detected electromagnetic signals in a memory;

means for determining a set of expected values based on said environmental measurements, said expected values being a prediction of a difference in electrical potential across a section of the earth, between the detector equipment location and the remote location;

means for measuring the electrical potential across the section of the earth between the detector equipment location and the remote location during a period of time wherein the event-related signal propagates therebetween;

means for generating a set of residual values based on said set of expected values and said set of measured values; and means for analyzing said set of residual values to detect the presence of the event-related signal.

* * * * *